(12) United States Patent
Percival, Jr.

(10) Patent No.: US 9,427,898 B2
(45) Date of Patent: Aug. 30, 2016

(54) APPARATUS FOR MOLDING POLYMERS AND COMPOSITE LAMINATES

(71) Applicant: Taylor Cable Products, Inc., Grandview, MO (US)

(72) Inventor: Jeffrey D. Percival, Jr., Linn Creek, MO (US)

(73) Assignee: Taylor Cable Products, Inc., Grandview, MO (US)

( * ) Notice: Subject to any disclaimer, the term of this patent is extended or adjusted under 35 U.S.C. 154(b) by 290 days.

(21) Appl. No.: 14/073,470

(22) Filed: Nov. 6, 2013

(65) Prior Publication Data

US 2014/0175703 A1 Jun. 26, 2014

Related U.S. Application Data

(60) Provisional application No. 61/723,082, filed on Nov. 6, 2012.

(51) Int. Cl.
*B29C 33/30* (2006.01)
*B29C 43/02* (2006.01)
*B29C 43/36* (2006.01)
*B29C 33/00* (2006.01)
*B29C 53/04* (2006.01)

(52) U.S. Cl.
CPC .......... *B29C 43/361* (2013.01); *B29C 33/0011* (2013.01); *B29C 33/307* (2013.01); *B29C 33/308* (2013.01); *B29C 43/021* (2013.01); *B29C 53/04* (2013.01)

(58) Field of Classification Search
CPC ............. B29C 33/0011; B29C 33/307; B29C 33/308; B29C 33/32; B29C 53/04; B29C 43/021; B29C 43/361
USPC ........................................................ 249/155
See application file for complete search history.

(56) References Cited

U.S. PATENT DOCUMENTS

| | | | | |
|---|---|---|---|---|
| 4,212,188 A | * | 7/1980 | Pinson | B21D 11/20 72/413 |
| 5,151,277 A | * | 9/1992 | Bernardon | B29C 33/302 249/155 |
| 5,796,620 A | * | 8/1998 | Laskowski | B29C 33/302 700/118 |
| 5,846,464 A | * | 12/1998 | Hoffman | B23Q 1/035 249/155 |
| 5,851,563 A | * | 12/1998 | Hoffman | B28B 7/02 249/155 |
| 6,032,348 A | * | 3/2000 | Haas | B25B 1/2421 269/266 |
| 6,298,896 B1 | * | 10/2001 | Sherrill | B29C 33/0011 156/581 |
| 8,057,206 B1 | * | 11/2011 | McKnight | B29C 33/0011 249/161 |

FOREIGN PATENT DOCUMENTS

| | | | | |
|---|---|---|---|---|
| AU | WO 8707233 A1 | * | 12/1987 | ........... B29C 33/307 |
| CA | 2487738 A1 | * | 5/2006 | ........... B29C 33/308 |
| FR | 2548577 A1 | * | 1/1985 | ............ B21D 37/02 |
| GB | 1425312 A | * | 2/1976 | ........... B29C 33/307 |

* cited by examiner

*Primary Examiner* — Robert B Davis
(74) *Attorney, Agent, or Firm* — Joseph M. Rolnicki; Evanc & Dixon, L.L.C.

(57) ABSTRACT

An apparatus molds sheets of thermoplastic material, thermoset plastic material and other similar molding materials into various desired shapes and contours. The apparatus has a molding surface that supports the thermoplastic sheet, thermoset plastic sheet or other similar material to be molded where the molding surface is adjustable vertically to a variety of different shapes and contours enabling the apparatus to form the molding material into panels having different shapes and contours.

17 Claims, 10 Drawing Sheets

APPARATUS FOR MOLDING POLYMERS AND COMPOSITE LAMINATES

This patent application claims the benefit of the filing date of provisional patent application Ser. No. 61/723,082, which was filed on Nov. 6, 2012.

FIELD OF THE INVENTION

The present invention pertains to an apparatus that molds sheets of thermoplastic material, thermoset plastic material and other similar molding materials into various desired shapes and contours. More specifically, the present invention is an apparatus having a molding surface that supports thermoplastic sheets, thermoset plastic sheets or other similar material sheets to be molded where the molding surface is adjustable to a variety of different shapes and contours enabling the apparatus to form the sheets into panels having various different shapes and contours.

BACKGROUND

Thermoplastic sheets, composite laminate and other similar molding material sheets that can be cured into hardened panels are often used in fabricating contoured body panels of products such as automobiles, boats and other products having bodies with smooth contoured surfaces. In molding sheets of this type, it is common practice to use a tool or solid mold that has a single surface with the desired shape and contours of the body panel to be fabricated. To achieve the desired shape and contours of the body panel, the solid mold surface must have substantially the exact same shape and contour desired for the body panel. It is common practice that a prototype body panel first be produced having the desired shape and contours of the final body panel. From the prototype body panel a solid mold is produced based on the shape and contours of the prototype. The solid mold can be produced by hand crafting or machining the mold surface on a solid material or by other similar known methods. All of these methods typically require substantial amounts of materials and are time consuming and therefore expensive. The mold will then be used to form thermoplastics sheets, composite laminate sheets or other similar molding material sheets into the desired final body panel.

There are often many difficulties encountered in producing a solid mold having a surface that in turn will form molding material sheets into the desired shape and contours of the final body panel. For example, in drape forming or molding of high temperature thermoplastics on a solid mold surface, there is a large degree of shrinkage of the thermoplastic sheet after the sheet has been molded on the mold surface and the sheet cools. Additionally, in molding the sheets of thermoplastics or composite laminates on a solid mold surface, it is often very difficult to completely engage the sheet material with the mold surface so that the sheet material stays in the desired shape and contour sought for the final molded body panel. As a result, it is often the case that the initial mold produced to achieve the desired final shape and configuration of a body panel may not achieve satisfactory results, requiring a further mold or molds to be produced before the sheet molding process achieves the desired shape and configuration of the body panel product. The need to produce several molds before arriving at the mold that will produce the desired shape and contours of the final body panel product is very time consuming and expensive.

The current practice of producing solid molds involves cutting the mold surface from a block of material using a computer numerical control (CNC) machine. The cut mold surface would then be finished in order to prepare the surface that will shape the molding material sheets and release the cured sheets properly. Again, this process of forming the molds is time consuming and costly. Many times the mold will have to be reconstructed and modified in order to gain acceptable quality in the shape and contour of the final product. Furthermore, if variations are made to the design of the final product in the development process of the product, the mold for that product must be either modified or completely remade. Again, this is especially difficult when the products to be made are low volume products, as is often the case in the art of forming thermoplastic or plastic composite replacement body panels.

SUMMARY OF THE INVENTION

The disadvantages associated with prior art apparatus and methods for molding sheet material are overcome by the apparatus of the invention that provides a molding surface that can be adjusted into a variety of different shapes and contour configurations whereby thermoplastic sheets, composite laminate sheets or other similar molding material sheets can be molded on the surface to produce a final product panel having a desired shape and contours. The apparatus of the invention is basically comprised of a base, a plurality of rods supported on the base, a molding platform supported on the ends of the rods above the base and a control central processing unit.

The base includes a housing or frame having opposite top and bottom surfaces and at least one side surface extending around the housing. The housing or frame functions as a support for the apparatus. The housing or frame also contains several of the mechanisms that enable the operation of the apparatus.

The plurality of rods are supported on the base with the rods projecting upwardly from the housing top surface. The rods are all parallel and are perpendicular to the housing top surface. The rods are arranged in a two dimensional array above the housing top surface and each of the rods contains a mechanism that is operatively connected with mechanisms supported on the housing that are controlled to adjust the length of each of the rods relative to the housing top surface.

The molding platform is constructed of one or more layers of flexible material. The platform has a top molding surface and an opposite bottom surface. The bottom surface of the platform is connected to the top ends of the plurality of rods. Adjusting the lengths of the rods will cause the molding platform to flex and adjust the top molding surface of the platform to form various different surface configurations and surface contours.

The apparatus is controlled by a central processing unit (CPU) that communicates with and controls the mechanisms in the base housing and in the plurality of rods. Information is manually input into the CPU and the CPU controls each of the rods to adjust their lengths in response to the input information. The adjustments in the lengths of the rods results in the molding platform moving in response to the rod movements. The movement of the molding platform shapes the top mold surface of the platform to a desired surface configuration where the mold surface will produce a body panel of a desired shape and contour from a thermoplastic material sheet, a composite laminate material sheet or other similar type of molding material sheet that is placed on the mold surface.

DESCRIPTION OF THE DRAWINGS

Further features of the invention are set forth in the following detailed description of the invention and in the drawing figures.

DESCRIPTION OF THE PREFERRED EMBODIMENT

Figure 1:
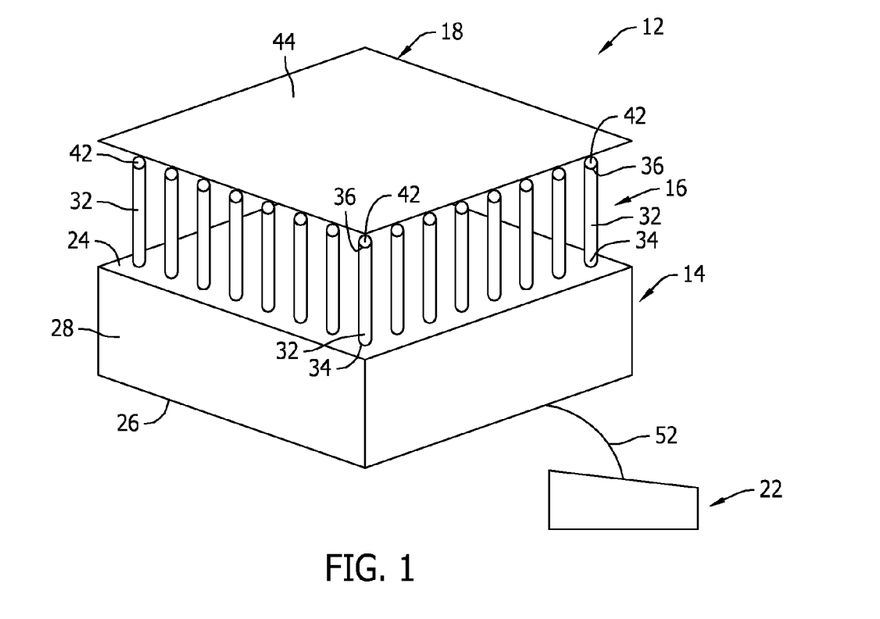
FIG. 1 is a perspective view of one embodiment of the apparatus of the invention.
Figure 2:
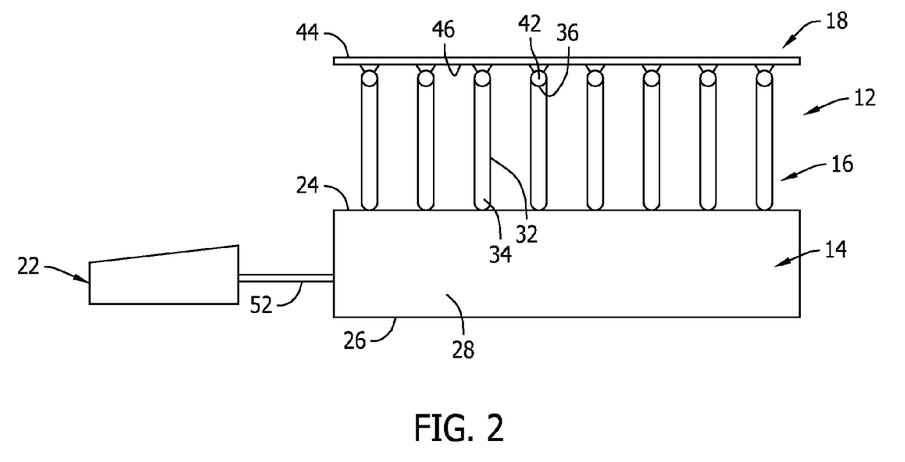
FIG. 2 is a side elevation view of the apparatus.
Figure 3:
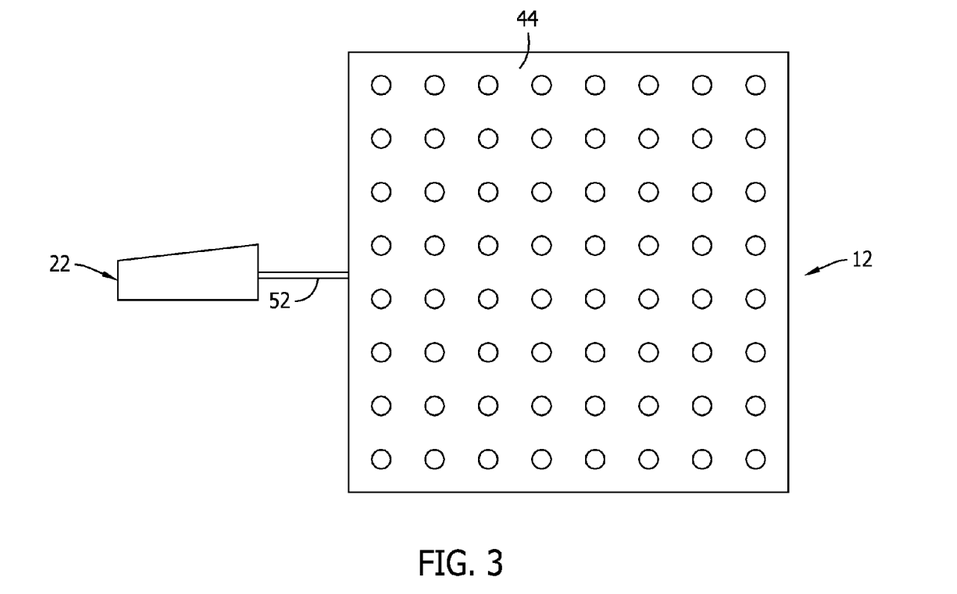
FIG. 3 is a top plan view of the apparatus
Figure 4:
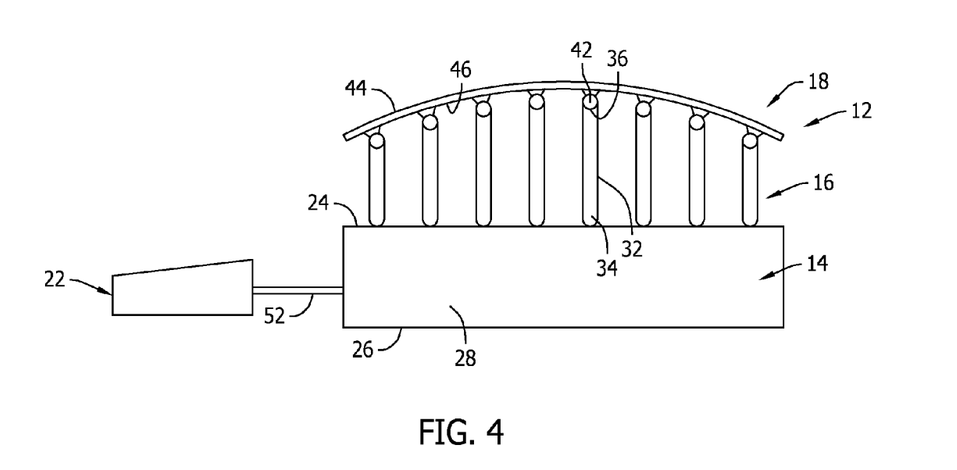
FIG. 4 is a side elevation view of the apparatus similar to that of FIG. 2, but with the rod lengths adjusted to form the molding platform with a desired molding surface configuration.

FIG. 1 is a perspective view of one illustrative embodiment of the apparatus of the invention. A seen in FIG. 1, the apparatus 12 is basically comprised of a base 14, a plurality of rods 16 supported on the base, a molding platform 18 supported on the rods, and a controlling central processing unit 22. With the apparatus 12 being designed to mold sheet material such as thermoplastic sheet, plastic composite sheet or other similar types of molded material sheets, the component parts of the apparatus are constructed of materials having sufficient strength for this intended purpose.

The base 14 in the embodiment shown in the drawing figures includes a housing having a top surface 24, an opposite bottom surface 26, and a side wall 28 extending around the housing. The housing shown has a general rectangular cubic configuration. However, this is only one example of the housing configuration and the housing can have other configurations to suit it for its intended purpose. Although not shown, the housing contains the devices and mechanisms needed for the intended functioning of the apparatus to be described.

The plurality of rods 16 project upwardly from the housing top surface 24 and are supported by the housing. The rods 16 are substantively identical in their constructions and their function. Each of the rods 16 has a generally cylindrical exterior surface that extends from a bottom end 34 of the rod at the housing top surface 24 to a top end 36 of the rod. The rods 16 are supported by the base 14 with each of the rods being parallel and with the rods arranged in a two dimensional array of the rods on the housing top surface 24. In the embodiment shown the two dimensional array includes the same number of rods 16 in the rows and columns of the array. In other embodiments of the apparatus the rows and columns of the array of rods 16 could have different numbers of rods, giving the array of rods a different configuration other than the square configuration shown in the drawing figures. Each of the rods 16 contains a linear adjustment mechanism. Each mechanism is operable to adjust the length of the rod 16 projecting from the housing top surface 24 independently of the other rods.

A plurality of universal couplings 42 are attached to the top ends 36 of the rods 16. The universal coupling 42 can be any known type of coupling or joint that enables the coupling to move freely in all directions around the length of its attached rod, for example a ball and socket joint.

The molding platform 18 has a flat rectangular configuration that is shaped and dimensioned to extend the platform over the plurality of couplings 42 on the top ends 36 of the rods 16. The platform 18 is constructed of one or more layers of flexible material that provide the platform with structural strength, but allow the platform to flex and bend to various different shapes having various different surface contours. The platform 18 has a substantially smooth top surface 44 and an opposite bottom surface 46. The top surface 44 is prepared as a molding surface that will support thermoplastic sheet, plastic composite sheet or other similar types of molding material sheet that can be cured into hardened panels and then easily removed from the molding surface 44. The platform bottom surface 46 is secured to each of the plurality of universal couplings 42 at the top ends 36 of the plurality of rods 16.

The central processing unit 22 communicates through an electrical connection 52 with the devices and mechanisms contained in the apparatus base 14. The unit 22 can be any known type of computer controlled device that can receive input information and communicate the information to the devices and the mechanisms in the apparatus base 14 to control those mechanisms to adjust the length of each of the rods 60. Information input into the unit 22, for example through a keyboard of the unit is communicated by the unit to the devices and the mechanisms of the base 14 to control each of the rods to adjust to a specific length in response to the input information. The adjustments in the lengths of the rod 16 results in the molding platform 18 and in particular the molding surface 44 of the platform to move in response to the movement of the rod 16. The movement of the molding platform 18 forms the platform molding surface 44 into the particular shape and configuration that will produce a body panel of a desired shape and contour from a thermoplastic material sheet, a composite laminate material sheet or other similar type of molding material sheet that has been placed on the molding surface 44.

Figure 5:
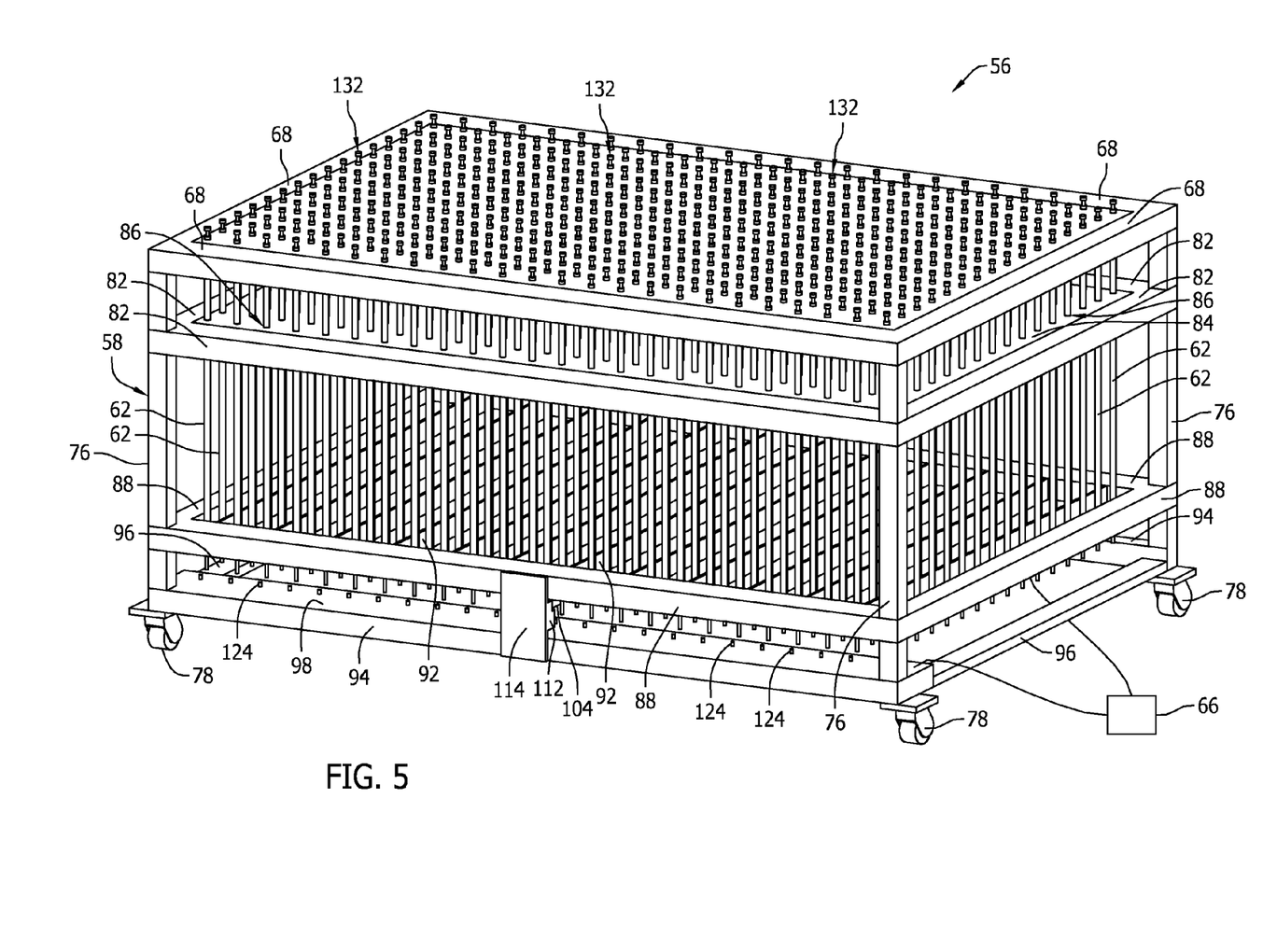
FIG. 5 is a right side perspective view of a further embodiment of the apparatus of the invention.
Figure 6:
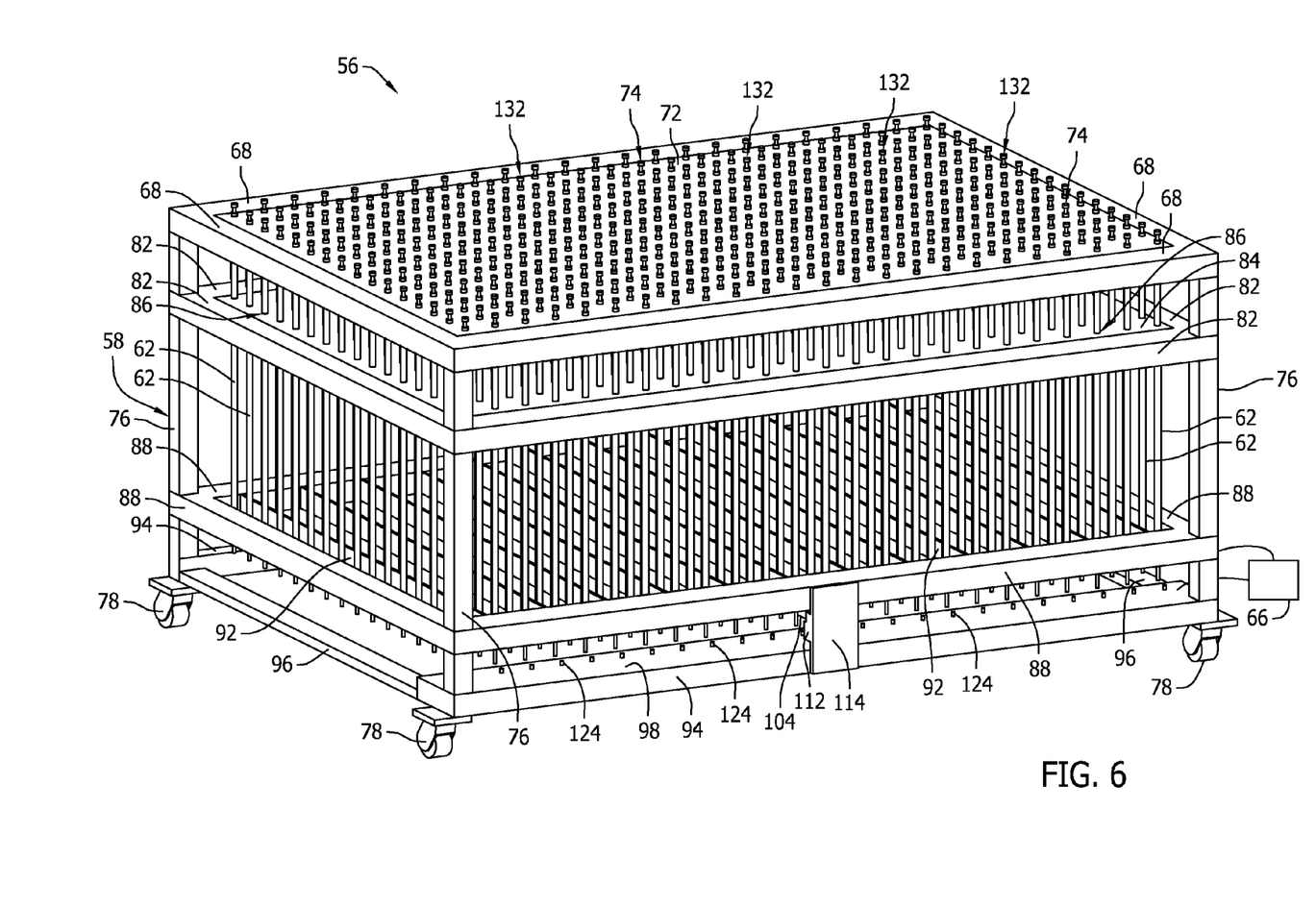
FIG. 6 is a left side perspective view of the apparatus shown in FIG. 5.

FIGS. 5 and 6 shown respective right and left side perspective views of a further embodiment of the apparatus 56. The apparatus 56 shown in FIGS. 5 and 6 is basically comprised of a base or frame 58, a plurality of rods 62 supported by the frame 58, a molding platform 64 supported on the rod 62, and the controlling central processing unit 66. As with the previously described embodiment, the apparatus 56 shown in FIGS. 5 and 6 is designed to mold sheet material such as thermoplastic sheet, plastic composite sheet, other similar types of molded material sheets, or other molding materials that can be formed or positioned on a molding surface in the general configuration of a sheet. The component parts of the apparatus are constructed of materials having sufficient strength for this intended purpose.

The frame 58 of the embodiment shown in FIGS. 5 and 6 has a generally rectangular cubic configuration defined by a plurality of horizontally oriented frame members or bars, and a plurality of vertically oriented frame members or bars.

The top of the frame 58 is constructed of four horizontally oriented top frame bars 68 that are connected together in a general rectangular configuration as shown in FIGS. 5 and 6. The top frame bars 68 define a top perimeter of the frame 58 and support a top panel 72 within the perimeter. The top panel 72 is provided with a plurality of holes 74 through the panel. The holes 74 are spacially arranged in a two-dimensional array of the holes. Spacially arranged rows of holes extend across the top panel 72 between the opposite sides of the frame and spacially arranged columns of holes extend across the top panel 72 between the front and back of the frame.

Four vertically oriented posts 76 support the top frame bars 68. The posts 76 are substantially parallel to each other and have top ends secured at the corners of the intersecting top frame bars 68 and the bottom ends that are secured to casters or rollers 78. The rollers 78 enable the apparatus 56 to be easily manually moved across a supporting surface.

Four horizontally oriented upper intermediate frame bars 82 are connected together in a general rectangular configuration between adjacent vertical posts 76. As shown in FIGS. 5 and 6, the upper intermediate bars 82 are parallel to the top bars 68 and are spaced vertically below the top bars. The four upper intermediate bars 82 support an intermediate panel 84 within the perimeter defined by the upper intermediate bars. The intermediate panel 84 has a plurality of holes 86 through the panel that align with the holes 74 through the top panel 72.

Four horizontally oriented lower intermediate bars 88 are connected together in a general rectangular configuration between adjacent vertical posts 76. The lower intermediate bars 88 are parallel with the upper intermediate bars 82 and are spaced vertically below the upper intermediate bars. A plurality of parallel, horizontally oriented support strips 92 extend between the front and rear bars of the lower intermediate bars 88 as shown in FIGS. 5 and 6. The strips 92 are spacially arranged between the opposite sides of the frame 58 where each strip 92 is positioned just to the left of but adjacent the aligned columns of holes 86 through the intermediate panel 84 and the columns of holes 74 through the top panel 72.

A pair of bottom frame bars 94 extends between the pair of vertical posts 76 at the opposite sides of the frame 58 at the front of the frame and the pair of vertical posts 76 at the opposite sides of the frame at the rear of the frame as seen in FIGS. 5 and 6.

A pair of drive tracks 96 extend between the pairs of vertical posts 76 on the right side of the frame 58 and the left side of the frame as shown in FIGS. 5 and 6. The drive tracks 96 have guide features in their top surfaces, for example channels recessed into the top surfaces that extend the lengths of the drive tracks.

Figure 7:
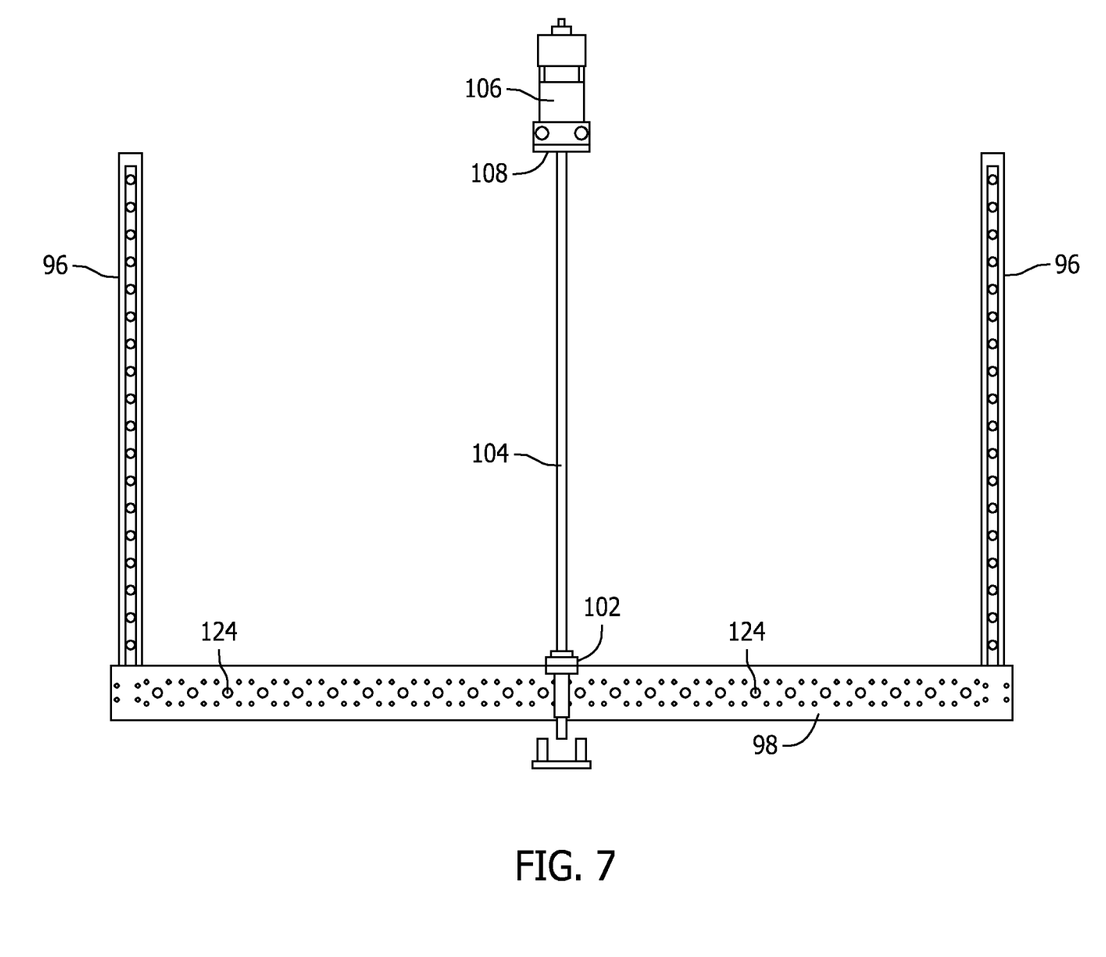
FIG. 7 is a top plan view of a feature of the apparatus shown in FIGS. 5 and 6 that supports the drive devices.
Figure 8:
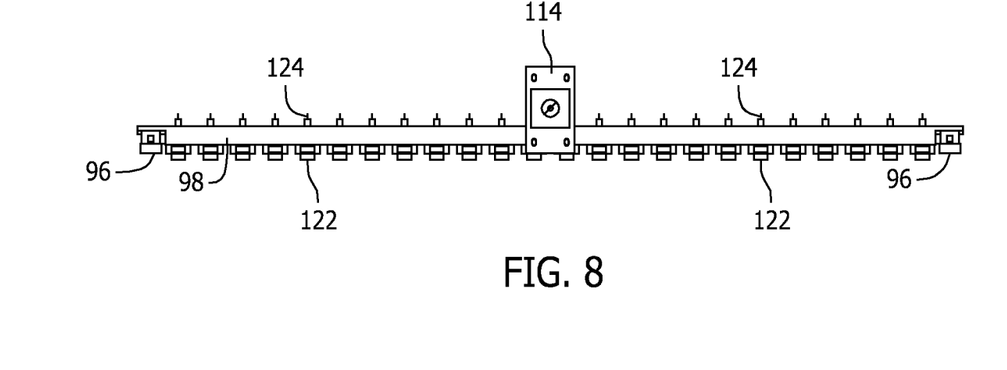
FIG. 8 is a front elevation view of the drive device support feature shown in FIG. 7.
Figure 9:
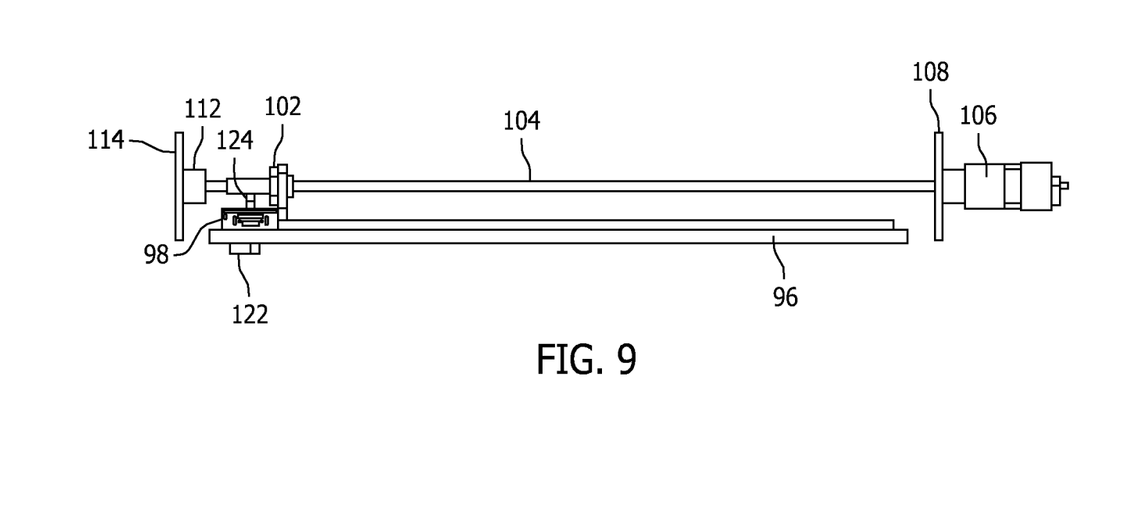
FIG. 9 is a side elevation view of the drive device support feature shown in FIG. 7.

A gantry housing 98 extends beneath the frame 58 between the two drive tracks 96. Opposite ends of the gantry housing have features that engage in the guide features of the drive tracks 96 and support the gantry housing 98 on top of the drive tracks. A drive mount, for example an internally threaded nut or other equivalent mechanism 102 is provided on the top surface of the gantry housing 98. A drive shaft 104, for example an externally threaded screw shaft or other equivalent mechanism extends through the drive mount 102. As shown in FIGS. 7-9, one end of the drive shaft 102 is operatively connected to the output of an electric motor 106.

The electric motor 106 is mounted by a support plate 108 to the rear of the frame 58. The opposite end of the drive shaft is received in a bearing assembly 112. The bearing assembly 112 is mounted to a support plate 114 that in turn is connected to the front of the frame 58. The electric motor 106 communicates with a control device such as a computer numerical control (CNC) or the controlling central processing unit (CPU) 66 of the apparatus that is represented schematically in FIGS. 7-9.

The controlling unit 66, in response to information input by an operator of the apparatus to the unit, controls the operation of the electric motor 106 to rotate the drive shaft 104 in the clockwise or counterclockwise directions for a controlled number of rotations. The rotations of the drive shaft 104 in the drive mount 102 move the gantry housing 98 over the drive tracks 96 in programmed incremental movements forward and rearward over the drive tracks 96 between the front and rear of the frame 58 and beneath the plurality of rods 62.

A plurality of small drive devices or electric motors 122 are supported on the gantry housing 98. As seen in FIGS. 7 and 8, the electric motors 122 are spacially arranged along the length of the gantry housing 98 with the output shafts 124 of the motors being oriented vertically upwardly and substantially parallel. Each of the electric motors 122 communicates with the central processing unit 66. In response to information input into the central processing unit 66 by an operator of the apparatus, the unit controls selectively turning on and turning off each the electric motors 124 for pre-programmed periods of time, and selectively controls each of the electric motors 124 to rotate in a clockwise direction or a counterclockwise direction.

As in the previously described embodiment, the plurality rods 62 are supported by the frame 58 in substantially parallel, vertical orientations. The rods 62 are supported by the frame 58 with the rods spacially arranged in a two-dimensional array that corresponds to the two-dimensional array of the holes 86 through the intermediate panel 84 and the holes 74 through the top panel 72. Rows of the rods 62 extend across the frame 58 between the opposite sides of the frame as viewed in FIGS. 5 and 6, and columns of rods 62 extend across the frame between the front and back of the frame. Each of the rods 62 is supported at its lower end by one of the strips 92 of the frame 58. The upper ends of each of the rods extends through one of the holes 86 in the upper intermediate panel 84 and is supported in its vertical orientation by the panel. The top end of each shaft projects above one of the holes 74 in the top panel 72.

Each of the rods 62 contains some type of linear actuator. For example, the rods 62 could be constructed with tubular outer housings having internal screw threading inside a hollow bore of the housings and screw threaded shafts extending through the bores of the housings and meshing with the internal screw threading. The tubular outer housings are free to move vertically up and down, but are secured against rotation. The bottom end of each shaft would be provided with a coupling that enables the bottom end of the shaft to be releasably coupled to the output shaft of one of the electric motors 106 when the motor is positioned below the shaft. On selective operation of the electric motor 106 the motor output shaft 108 is rotated either clockwise or counterclockwise and the screw thread shaft is rotated in the internal screw threading of the tubular housing causing the top end of the rod to extend upwardly from the frame top panel 72 or move downwardly toward the frame top panel. Any other equivalent type of linear actuator mechanism that converts opposite directions of rotation of an output shaft of a motor 106 positioned below the rod 62 to upward and downward movements of the top end of the rod could be employed in the rod 62.

A plurality of universal couplings 132 are attached to the top ends of the rods 62. The universal couplings 132 could be any known type of coupling or joint that enables the coupling to move freely in all directions around the length of its attached rod, for example a ball and socket joint.

Figure 10:
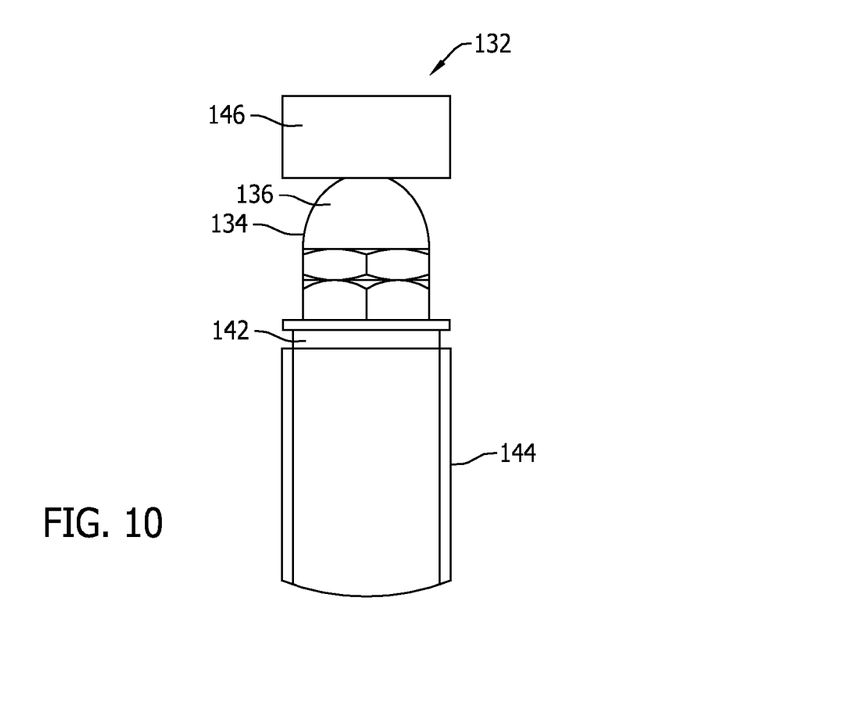
FIG. 10 is a partial view of a universal coupling employed on the apparatus.
Figure 11:
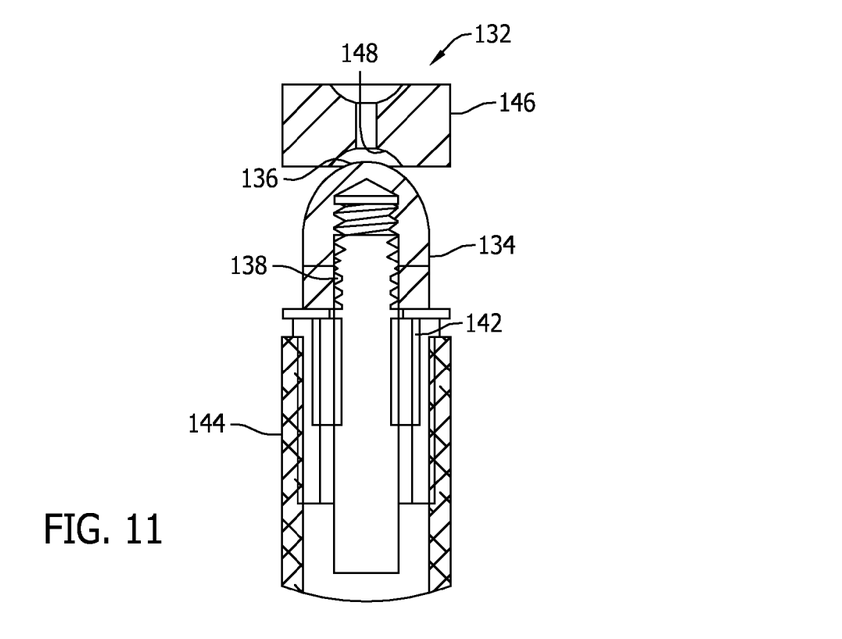
FIG. 11 is a sectioned view of the universal coupling shown in FIG. 10.

FIGS. 10 and 11 show another example of such a universal coupling. The universal coupling 132 shown in FIGS. 10 and 11 is basically comprised of an acorn nut 134 having a rounded or ball shaped exterior surface 136. The nut 134 is screw threaded on an externally threaded rod 138 that is secured in a cylindrical insert 142 that in turn is secured in a tube 144 at the top end of a rod 62. A magnet 146 is attracted to the rounded surface 136 of the acorn nut 134. The magnet 146 has a concave center depression 148 or socket in the bottom of the magnet. The magnetic attraction of the magnet socket 184 to the ball shaped exterior surface 136 of the acorn nut 134 provides the universal connection between the top end of the rod 62 and the magnet 146. The magnet 146 is secured in any known manner to the bottom surface of the molding platform 64 in a position above a rod 62, thereby providing a universal connection between the top of a rod 62 and the bottom surface of the molding surface platform 64.

Figure 12:
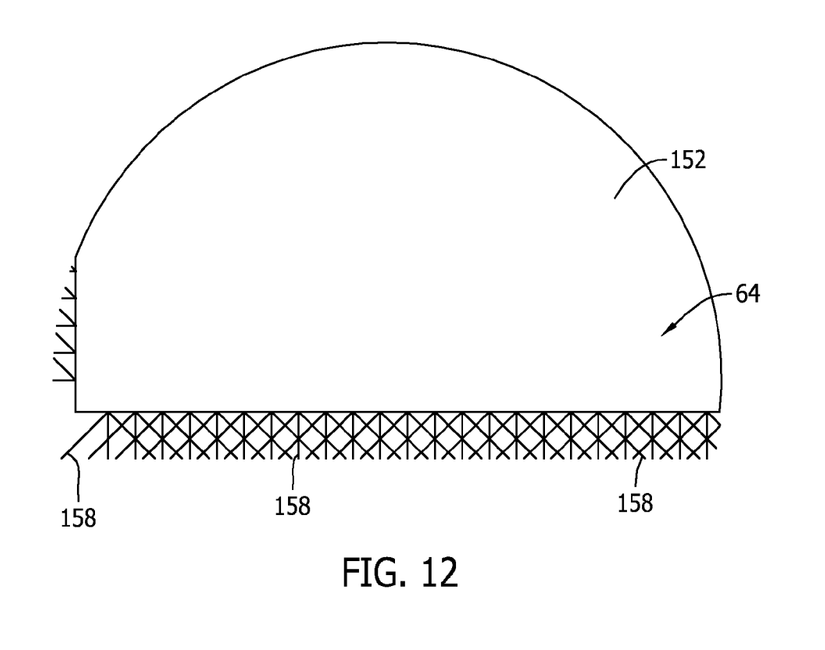
FIG. 12 is a partial view of the molding platform of the apparatus.
Figure 13:
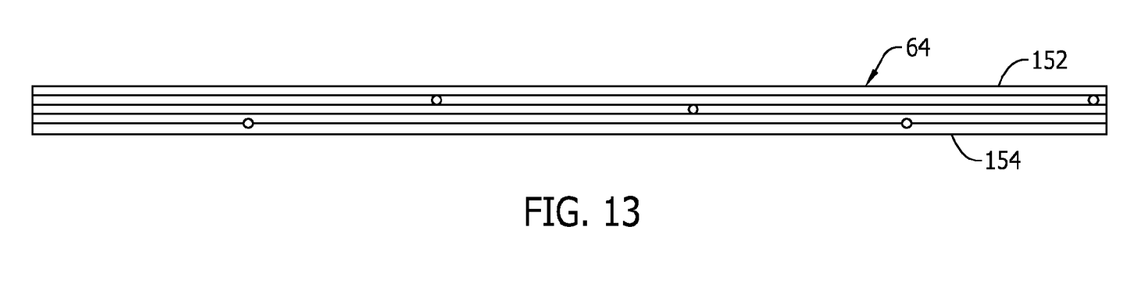
FIG. 13 is a side elevation view of the molding platform.
Figure 14:
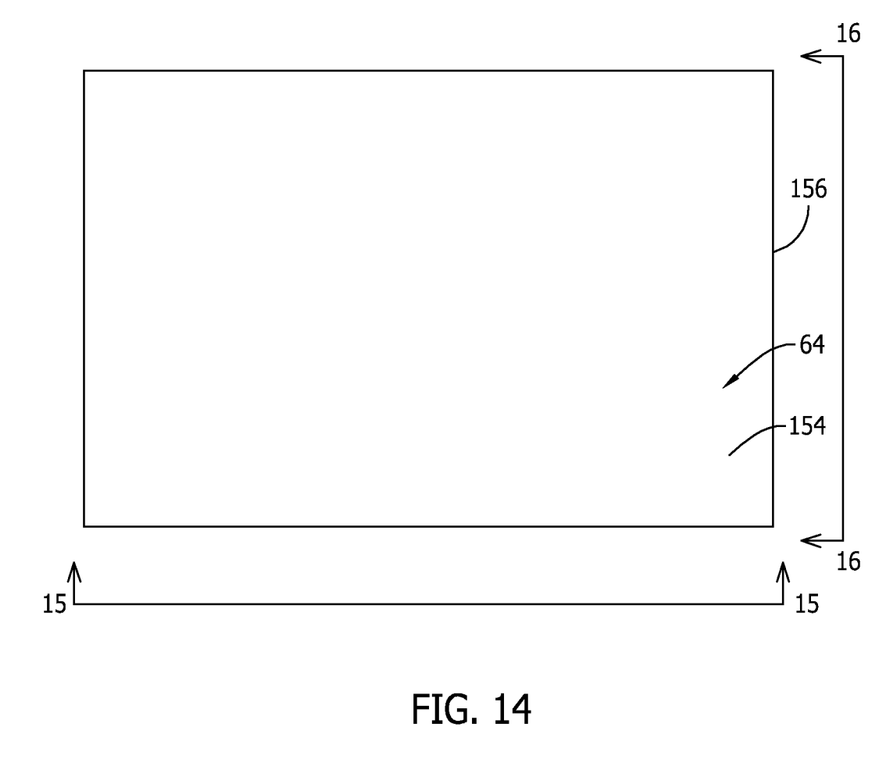
FIG. 14 is a top plan view of the molding platform.
Figure 15:
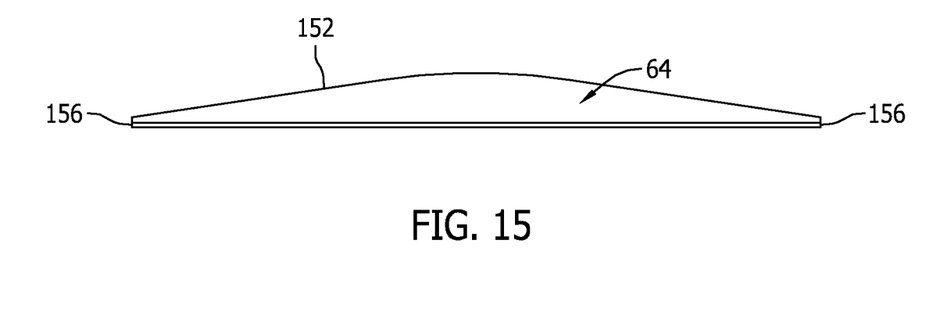
FIG. 15 is a side elevation view of the molding platform along the line 15-15 shown in FIG. 14.
Figure 16:
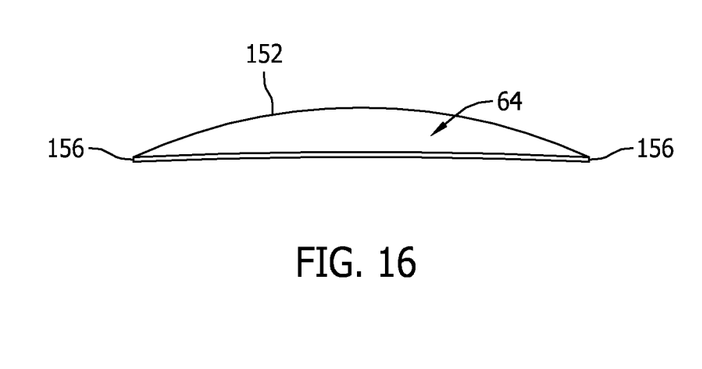
FIG. 16 is a side elevation view of the molding platform along the line 16-16 shown in FIG. 14.

The molding platform 64 has a flat rectangular configuration that is shaped and dimensioned to extend the platform over the plurality of rods 62 supported on the frame 58. The molding platform 64 has a top, planar surface 152 and an opposite bottom surface 154. The top surface 152 has mutually perpendicular length and width dimensions. The rectangular peripheral edge 156 of the top surface 152 basically corresponds with the frame periphery defined by the four top frame bars 68. The top surface 152 is smooth and continuous within the peripheral edge 156. The molding platform 64 is constructed of several layers of flexible material. A plurality of flexible strands 158 extend through the flexible material between the top surface 152 and bottom surface 154. The strands 158 can be seen in FIGS. 12 and 13. In the preferred embodiment, the strands 158 are arranged in a criss-crossing pattern as represented in FIG. 12. Furthermore, in a preferred embodiment the strands 158 are spring steel wire.

The top surface 152 is prepared as a molding surface that will support thermoplastic sheet, plastic composite sheet or other similar types of molding material sheet, or materials that could be poured or spread on the top surface and that can be cured into hardened panels and then easily removed from the molding surface 152.

The platform bottom surface 154 is secured to each of the plurality of universal couplings that secure the bottom surface to the top ends of the rods 162. For example, in the embodiment described earlier the plurality of magnets 164 at the tops of each of the universal couplings are secured to the platform bottom surface 154 in a spacial arrangement that corresponds to the two-dimensional array of rods 162 supported by the frame 58. The magnets 146 can be secured to the bottom surface 154 by adhesives or in any other equivalent manner Each of the magnets 146 is positioned with its socket 148 over one of the ball shaped surfaces 136 of the acorn nuts 134 at the tops of each of the rods 62. This secures the platform bottom surface 154 to each of the plurality of universal couplings at the top ends of the rods 62.

In operation of the embodiment of the apparatus shown in FIGS. 5-16, an operator of the apparatus inputs information into the central processing unit 66 based on the desired shape and configuration of a sheet of molding material placed on the top surface 152 of the molding platform. The information input into the central processing unit 66 is communicated to the motor 106 controlling movements of the gantry housing 98 to cause the gantry to move beneath the first row of rods 62 supported at the front of the frame 58. The central processing unit 66 then controls the plurality of motors 122 on the gantry housing 98 to adjust the lengths of each of the rods 62 in the row and thereby cause the molding platform to move vertically along its length and width dimensions whereby separate portions of the top surface 152 move vertically relative to other adjacent portions of the top surface. This procedure is repeated for each of the rows of rods 62 whereby the vertical adjustment in the length of the rods 62 controlled by the CPU 66 causes separate portions of the top surface 152 along the length and width dimensions to move vertically relative to adjacent portions of the top surface and move the sheet of molding material supported on the top surface vertically to a desired configuration of the sheet of molding material. The adjusted top surface 152 holds the sheet of molding material in its desired configuration until the sheet of molding material cures and solidifies. The movement of the molding platform 64 forms the platform top surface 152 and the sheet of molding material supported on the top surface into the particular shape and configuration desired that will produce a body panel of a desired shape and contour from the molding material sheet.

The apparatus of the invention enables an individual to use a single apparatus to accurately replicate surfaces or shapes available in three dimensional electronic geometry by way of a simple entry of numerical data into the control unit of the apparatus, thereby providing information on a "real" surface to the control unit for the purposes of molding various materials within minutes into the replicated surface, as well as consuming a minimal amount of materials and without requiring any other equipment.

The apparatus replicates three dimensional geometry of a known shape having known three dimensional locations of points on the shape by inputting information into the apparatus control unit to control the plurality of rods to position their top ends in identical positions to the three dimensional array of known points and thereby produce a "point cloud" at the adjusted top ends of the apparatus rods. The top surface of the molding platform overlaying the point cloud created by the rod top ends provides a smooth molding surface between adjacent rod top ends and provides an accurate molding surface to replicate the desired three dimensional geometry.

As various modifications could be made in the construction of the apparatus and its method of use herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. An apparatus for molding sheet materials comprising:
a molding platform having a top surface and opposite bottom surface, the top surface having mutually perpendicular length and width dimensions, the top surface being flexible enabling separate portions of the top surface along the length and width dimensions to move vertically, and the top surface being adapted for supporting molding material and moving the molding material vertically to a desired configuration of the molding material in response to vertical movements of the separate portions of the top surface;

a plurality of vertically oriented rods beneath the molding platform, the plurality of rods having top ends that are operatively connected to the molding platform bottom surface, the plurality of rod top ends being vertically moveable to raise and lower and thereby vertically move the separate portions of the top surface;

a plurality of drive devices operatively connected with the plurality of rods, the plurality of drive devices being actuatable to move the plurality of rod top ends; and, a control device that is operatively connected with the plurality of drive devices to control actuation of the plurality of drive devices;

the molding platform being flexible and having a plurality of flexible reinforcement strands extending through the molding platform between the top surface and the bottom surface; and, the plurality of flexible reinforcement strands being spring steel wire.

2. The apparatus of claim 1, further comprising:
the top surface being a smooth, continuous surface.

3. The apparatus of claim 1, further comprising:
the plurality of flexible reinforcement strands criss-crossing in the molding platform.

4. The apparatus of claim 1, further comprising:
the plurality of rod top ends being connected to the molding platform bottom surface by universal couplings.

5. The apparatus of claim 1, further comprising:
the plurality of rods being parallel and being arranged in a two-dimensional array beneath the molding platform.

6. The apparatus of claim 1, further comprising:
the plurality of rod top ends each being operatively connected to the molding platform bottom surface beneath one of the separate portions of the top surface.

7. The apparatus of claim 1, further comprising:
the plurality of rods having bottom ends opposite the top ends, and the plurality of rod bottom ends each being releasably couplable to a drive device of the plurality of drive devices.

8. An apparatus for molding sheet materials comprising:
a molding platform having a top, planar surface and an opposite bottom surface, the top surface having mutually perpendicular length and width dimensions, the platform being flexible along the length and width dimensions enabling separate portions of the top surface along the length and width dimensions to move vertically relative to other adjacent portions of the top surface, the top surface being adapted to support molding material and move the molding material vertically to a desired configuration of the molding material and hold the molding material in the desired configuration as the molding material cures and solidifies in the desired configuration on the top surface;

a plurality of vertically oriented rods operatively connected with the molding platform bottom surface, the plurality of rods containing a plurality of linear actuators with each rod of the plurality of rods containing a linear actuator of the plurality of linear actuators, the plurality of linear actuators being operable to selectively vertically raise and lower the separate portions of the top surface along the length and width dimensions;

a control device communicating with the plurality of linear actuators, the control device being operable to selectively move linear actuators of the plurality of linear actuators; and, the molding platform being flexible and having a plurality of flexible reinforcement strands of spring steel criss-crossing in the molding platform between the top surface and the bottom surface.

9. The apparatus of claim 8, further comprising:
the top surface being a smooth continuous surface.

10. The apparatus of claim 8, further comprising:
the molding platform being flexible and having a plurality of flexible reinforcement strands extending through the molding platform between the top surface and the bottom surface.

11. The apparatus of claim 10, further comprising:
the plurality of flexible reinforcement strands criss-crossing in the molding platform.

12. The apparatus of claim 8, further comprising:
the plurality of vertically oriented rods having top ends that are operatively connected with the molding platform bottom surface, the plurality of rods top ends being moveable vertically; and,
the separate portions of the top surface along the length and width dimensions moving vertically relative to other adjacent portions of the top surface in response to vertical movements of the plurality of rod top ends.

13. The apparatus of claim 12, further comprising:
a plurality of drive devices operatively connected with the plurality of rods, the plurality of drive devices moving the plurality of rod top ends vertically in response to actuation of the plurality of drive devices.

14. The apparatus of claim 13, further comprising:
the control device communicating with the plurality of drive devices and controlling selective actuation of the plurality of drive devices.

15. The apparatus of claim 8, further comprising:
the plurality of linear actuators each being operatively connected with the molding platform bottom surface beneath one of the separate portions of the top surface along the length and width dimensions of the top surface.

16. The apparatus of claim 14, further comprising:
the plurality of rods being parallel and arranged in a two-dimensional array beneath the molding platform.

17. The apparatus of claim 14, further comprising:
the plurality of rods having bottom ends opposite the top ends, and the plurality of rod bottom ends each being releasably couplable to a drive device of the plurality of drive devices.

* * * * *